(12) United States Patent
Griffith (10) Patent No.: US 9,799,136 B2
(45) Date of Patent: Oct. 24, 2017

(54) SYSTEM, METHOD AND APPARATUS FOR RAPID FILM PRE-VISUALIZATION

(75) Inventor: John M. Griffith, Los Angeles, CA (US)

(73) Assignee: TWENTIETH CENTURY FOX FILM CORPORATION, Los Angeles, CA (US)

( * ) Notice: Subject to any disclaimer, the term of this patent is extended or adjusted under 35 U.S.C. 154(b) by 866 days.

(21) Appl. No.: 13/466,522

(22) Filed: May 8, 2012

(65) Prior Publication Data

US 2013/0162628 A1 Jun. 27, 2013

Related U.S. Application Data (60) Provisional application No. 61/578,695, filed on Dec. 21, 2011, provisional application No. 61/644,022, filed on May 8, 2012, provisional application No. 61/644,066, filed on May 8, 2012.

(51) Int. Cl.
*G06T 15/00* (2011.01)
*G06T 15/20* (2011.01)

(52) U.S. Cl.
CPC .................................. *G06T 15/20* (2013.01)

(58) Field of Classification Search
None
See application file for complete search history.

(56) References Cited

U.S. PATENT DOCUMENTS

| | | |
|---|---|---|
| D376,826 S | 12/1996 | Ashida |
| D391,998 S | 3/1998 | Jwo |
| D405,835 S | 2/1999 | Goto |
| 5,893,798 A | 4/1999 | Stambolic et al. |
| D410,914 S | 6/1999 | Tyler et al. |
| 6,394,904 B1 | 5/2002 | Stalker |
| 6,614,420 B1 | 9/2003 | Han et al. |
| D517,124 S | 3/2006 | Merril et al. |
| D521,567 S | 5/2006 | Svendsen et al. |
| D541,771 S | 5/2007 | Chung |
| D545,692 S | 7/2007 | Bhavnani |
| D624,535 S | 9/2010 | Tsai et al. |
| D634,320 S | 3/2011 | Bliven et al. |
| 7,985,137 B1 | 7/2011 | Klitsner et al. |
| 8,118,680 B2 | 2/2012 | Layne, IV et al. |
| D665,461 S | 8/2012 | Ikeda et al. |
| D670,664 S | 11/2012 | Brown |

(Continued)

FOREIGN PATENT DOCUMENTS

KR   1020070099949   10/2007

OTHER PUBLICATIONS

International Application No. PCT/US2012/070536 International Search Report and Written Opinion dated Apr. 26, 2013, 8 pages.

(Continued)

*Primary Examiner* — Michelle Chin
(74) *Attorney, Agent, or Firm* — Cantor Colburn LLP (57) ABSTRACT

A system, method and apparatus for rapid film pre-visualization are provided, including a motion capture component interfacing with wearable motion capture sensors; a virtual digital rendering component configured to receive the captured motion and re-create such motion in a three dimensional virtual space; a display component configured to display an output of the virtual digital rendering component; and a controller component, configured to interface with the virtual digital rendering component and allow a user to navigate within the three dimensional virtual space to control the visual aspects of one or more shots within the three dimensional virtual space.

24 Claims, 12 Drawing Sheets

(56) References Cited

U.S. PATENT DOCUMENTS

| | | | |
|---|---|---|---|
| 2002/0109680 A1* | 8/2002 | Orbanes et al. | 345/418 |
| 2005/0270368 A1* | 12/2005 | Hashimoto | 348/61 |
| 2007/0122027 A1 | 5/2007 | Kunita et al. | |
| 2007/0206832 A1* | 9/2007 | Gordon et al. | 382/103 |
| 2008/0094358 A1* | 4/2008 | Sullivan | 345/161 |
| 2008/0231926 A1 | 9/2008 | Klug et al. | |
| 2009/0111670 A1* | 4/2009 | Williams | 482/146 |
| 2009/0324017 A1 | 12/2009 | Gordon et al. | |
| 2010/0107127 A1 | 4/2010 | Han et al. | |
| 2010/0211345 A1* | 8/2010 | Von Zon | 702/94 |
| 2010/0253676 A1 | 10/2010 | Mumbauer et al. | |
| 2011/0025562 A1 | 2/2011 | Hol et al. | |
| 2011/0102424 A1* | 5/2011 | Hibbert et al. | 345/419 |
| 2012/0194645 A1* | 8/2012 | Fuller et al. | 348/46 |

OTHER PUBLICATIONS

Anonymous: "Motion capture—Wikipedia, the free encyclopedia," Dec. 10, 2011, Retrieved from the internet: URL:https://en.wikipedia.org/w/index.php?title=Motion_capture&oldid=465068990 [retrieved on Oct. 23, 2015], 16 pages.

EP Application No. 12860874.2 Partial Supplementary European Search Report, Issued Oct. 30, 2015, 7 pages.

G. Welch, et al., "Motion tracking: No silver bullet, but a respectable arsenal," IEEE Computer Graphics and Applications, IEEE Service Center, New York, NY, US, vol. 20, No. 6, Nov. 1, 2002, pp. 24-38.

Anonymous: "Razer Hydra—Wikipedia, the free encyclopedia," Oct. 21, 2011, XP055258604, Retrieved from the Internet: URL: https://en.wikipedia.org/w/index.php?title=Razer_Hydra&oldid=456739291 [retrieve Mar. 15, 2016], 3 pages.

European Patent Application No. 12860874.2 Extended European Search Report and Written Opinion dated Mar. 30, 2016, 15 pages.

New Zealand Application No. 719982, First Examination Report dated May 31, 2016, 2 pages.

Thibaut Weise et al., "Realtime performance-based facial animation," ACM Transactions on Graphics (TOG), ACM, vol. 30, No. 4, Article 77, Publication date: Jul. 2011, 9 pages.

* cited by examiner

SYSTEM, METHOD AND APPARATUS FOR RAPID FILM PRE-VISUALIZATION

CROSS REFERENCE TO RELATED APPLICATIONS

The present application claims priority to U.S. Provisional Patent Application Ser. No. 61/578,695 filed Dec. 21, 2011; U.S. Provisional Patent Application No. 61/644,022 filed May 8, 2012, and U.S. Provisional Patent Application No. 61/644,066 filed May 8, 2012, the entire contents of each of which are specifically incorporated by reference herein.

TECHNICAL FIELD

This invention relates generally to pre-visualization of film, e.g. feature films. More particularly, this invention relates to methods, systems and apparatuses for rapid, near real-time or real-time pre-visualization of films.

BACKGROUND OF THE INVENTION

Pre-visualization is a technique whereby a script or storyline is rendered into one or more images representative of that script or storyline. Traditional methods involved the generation of comics, storyboards, proposed frame sketches, etc., by an artist reading the script in an attempt to capture a writer's or director's vision. More recently, computer animation, possibly even using motion capture technologies with an actor or stuntman, have been used to produce proposed pre-visualizations for later review by a director.

However, a common problem with all of these approaches is the fact that all of these pre-visualization activities are merely attempts by others to capture the vision (action, style of the shot, etc.) of a director on a scene by scene director. While a director or producer might review a script with a traditional pre-visualization team prior to generation of the pre-visualization materials, it is a common problem that the end result is not what a director or producer ultimately wants. This may be on the level of disliking one particular action sequence, not liking a series of pans or angles on some or all of the pre-visualization materials, or simply not liking the feel of the pre-visualization materials.

Dislike of the pre-visualization materials by a director or producer sends a pre-visualization team back to the drawing boards for generating second (or multiple) attempts to capture the vision of the director before the film can move forward. Accordingly, this process is expensive and inaccurate, involving many artists and/or animators over a several weeks or months, before further production can proceed. Additionally, because the creative vision of the producers and directors was not ongoing in the animators' process, all this work might be scrapped when the final product was shared with the Studio, exec producers or the director.

Also, in general, motion capture of live performance in real time has also been extremely inefficient and expensive. For example, in the making of the film AVATAR, James Cameron's LightStorm production company developed a filming system and process requiring; costly, tethered light reflective mo-cap suits, a huge (warehouse sized) volume filled with IR cameras and HD cameras, and a heavy and bulky virtual hand-held, tethered camera wielded by the director (weighing approximately 35 lbs). The footage secured within that virtual camera was limited artistically to a camera lens view of the action, and the walking distance of the director. Additionally, the actual actors who's performances were necessary for the production spent months on call and on set to pre-capture their contributions to the film, thus further representing huge financial and time expenses. Because of these limitations, the captured footage was actual final film footage (which would have been captured after the pre-visualization stage).

Accordingly, there is a need in the art for an improved system, method and apparatus for rapid film pre-visualization that avoids the above described problems and disadvantages.

SUMMARY

The above described and other problems and disadvantages of the prior art are overcome and alleviated by the present system, method and apparatus for rapid film pre-visualization, including a motion capture component interfacing with wearable motion capture sensors; a virtual digital rendering component configured to receive the captured motion and re-create such motion in a three dimensional virtual space; a display component configured to display an output of the virtual digital rendering component; and a controller component, configured to interface with the virtual digital rendering component and allow a user to navigate within the three dimensional virtual space to control the visual aspects of one or more shots within the three dimensional virtual space.

In exemplary embodiments, a user (e.g., a director) can navigate through the space in real time to generate pre-visualizations according to the user's preference or vision. Exemplary embodiments allow for rough pre-visualizations, e.g. using MAYA as the virtual digital rendering component to output flat shaded blasts for approval. Other exemplary embodiments allow for more developed pre-visualzations, e.g., using an engine such as CRYENGINE 3 to provide development (e.g., virtual terrain, etc.) to the three dimensional virtual space defined by the pre-visualization process.

Also in exemplary embodiments, the controller may be a handheld device incorporating a screen along with one or more hand controllers, wherein the hand controllers are configured to provide navigation in the three dimensional virtual space and to provide film camera controls, such as pan, tilt, zoom, etc. In one particular exemplary embodiment, at least one hand control includes a navigation control that provides six degrees of movement within the three dimensional virtual space (for reference, the "SpaceNavigator" from 3dConnexion provides six degrees of motion control). In exemplary embodiments, the controller's physical position and positional changes are tracked via a magnetic field, e.g., such as is done with the Razer Hydra system in video gaming, to provide additional navigation functionality to the controller. In other embodiments, rather than using a controller hand component similar the "SpaceNavigator", two hand controllers similar to the Razer Hydra controller may be interconnected by a bar. In any of the controller embodiments, a screen or viewfinder may or may not be used (e.g., mounted on a bar extending between left and right hand controller units), according to the preference of the user.

In other exemplary embodiments, the motion capture component utilizes plural radio frequency (RF) detectors in a motion grid (an exemplary motion grid may contain, e.g., nine RF detectors and head and foot tags, which facilitate removing drift inherent in the system). An exemplary system includes an XSENS system, including such a motion grid and MVN suits (which include accelerometers therein). An exemplary system for interfacing with the virtual digital rendering component (e.g., MAYA) includes an IKinema system, which generates 'stick figures' from the positional data emitted by accelerometers in the suit(s). In exemplary embodiments, the virtual digital rendering component (e.g., MAYA), provides the environment framework for generating characters in a virtual three dimensional space.

According to some or all of the above exemplary embodiments, the present invention thus provides systems, methods and apparatuses that provide fast pre-visualization for films utilizing control input, such as input from a director, to shape the pre-visualization. Thus, exemplary embodiments might provide a system where performers (actors, stuntmen, etc.) wearing wireless suits are choreographed in real time by a film's director. The director can sit in front of a display that shows the output of the captured motion in a three dimensional virtual environment and can both navigate and shape the visual shot within the three dimensional virtual environment according to the director's taste and vision. The pre-visualizations can be output in basic form (e.g., flat shaded blasts) or within a virtual world generated from an engine, such as the CRYENGINE 3, UNREAL engine, etc. The pre-visualizations can be generated on-set with the motion capture and with the director, in addition to the data being subsequently available (after motion capture) for off-set variations.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGURES.

DETAILED DESCRIPTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the terms "photo," "photograph," "image," or any variation thereof may be interchangeable. Thus, any form of graphical image may be applicable to example embodiments.

It will also be understood that the terms "audio," "audio tracks," "music," "music tracks," or any variation thereof may be interchangeable. Thus any form of audio may be applicable to example embodiments.

It will also be understood that the terms "film," "media," "multi-media," "video," or any variation thereof may be interchangeable. Thus any form of rich media may be applicable to example embodiments.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

As described herein, example embodiments of the present invention may include systems, methods and apparatus for rapid film pre-visualization, including a motion capture component interfacing with wearable motion capture sensors; a virtual digital rendering component configured to receive the captured motion and re-create such motion in a three dimensional virtual space; a display component configured to display an output of the virtual digital rendering component; and a controller component, configured to interface with the virtual digital rendering component and allow a user to navigate within the three dimensional virtual space to control the visual aspects of one or more shots within the three dimensional virtual space.

In exemplary embodiments, a user (e.g., a director) can navigate through the space in real time to generate pre-visualizations according to the user's preference or vision. Exemplary embodiments allow for rough pre-visualizations, e.g. using MAYA as the virtual digital rendering component to output flat shaded blasts for approval. Other exemplary embodiments allow for more developed pre-visualzations, e.g., using an engine such as CRYENGINE 3 to provide development (e.g., virtual terrain, etc.) to the three dimensional virtual space defined by the pre-visualization process.

Also in exemplary embodiments, the controller may be a handheld device incorporating a screen along with one or more hand controllers, wherein the hand controllers are configured to provide navigation in the three dimensional virtual space and to provide film camera controls, such as pan, tilt, zoom, etc. In one particular exemplary embodiment, at least one hand control includes a navigation control that provides six degrees of movement within the three dimensional virtual space (for reference, the "SpaceNavigator" from 3dConnexion provides six degrees of motion control). In exemplary embodiments, the controller's physical position and positional changes are tracked via a magnetic field, e.g., such as is done with the Razer Hydra system in video gaming, to provide additional navigation functionality to the controller. In other embodiments, rather than using a controller hand component similar the "SpaceNavigator", two hand controllers similar to the Razer Hydra controller may be interconnected by a bar. In any of the controller embodiments, a screen or viewfinder may or may not be used (e.g., mounted on a bar extending between left and right hand controller units), according to the preference of the user.

In other exemplary embodiments, the motion capture component utilizes plural radio frequency (RF) detectors in a motion grid (an exemplary motion grid may contain, e.g., nine RF detectors and head and foot tags, which facilitate removing drift inherent in the system). An exemplary system includes an XSENS system, including such a motion grid and MVN suits (which include accelerometers therein). An exemplary system for interfacing with the virtual digital rendering component (e.g., MAYA) includes an IKinema system, which generates 'stick figures' from the positional data emitted by accelerometers in the suit(s). In exemplary embodiments, the virtual digital rendering component (e.g., MAYA), provides the environment framework for generating characters in a virtual three dimensional space.

According to some or all of the above exemplary embodiments, the present invention thus provides systems, methods and apparatuses that provide fast pre-visualization for films utilizing control input, such as input from a director, to shape the pre-visualization. Thus, exemplary embodiments might provide a system where performers (actors, stuntmen, etc.) wearing wireless suits are choreographed in real time by a film's director. The director can sit in front of a display that shows the output of the captured motion in a three dimensional virtual environment and can both navigate and shape the visual shot within the three dimensional virtual environment according to the director's taste and vision. The pre-visualizations can be output in basic form (e.g., flat shaded blasts) or within a virtual world generated from an engine, such as the CRYENGINE 3, UNREAL engine, etc. The pre-visualizations can be generated on-set with the motion capture and with the director, in addition to the data being subsequently available (after motion capture) for off-set variations. Further, due to the relatively small size of various components, the present system provides a portable capture, processing and pre-visualization system that permits easy relocation and use in office type settings.

Hereinafter, example embodiments of the present invention are described in detail.

Figure 1:
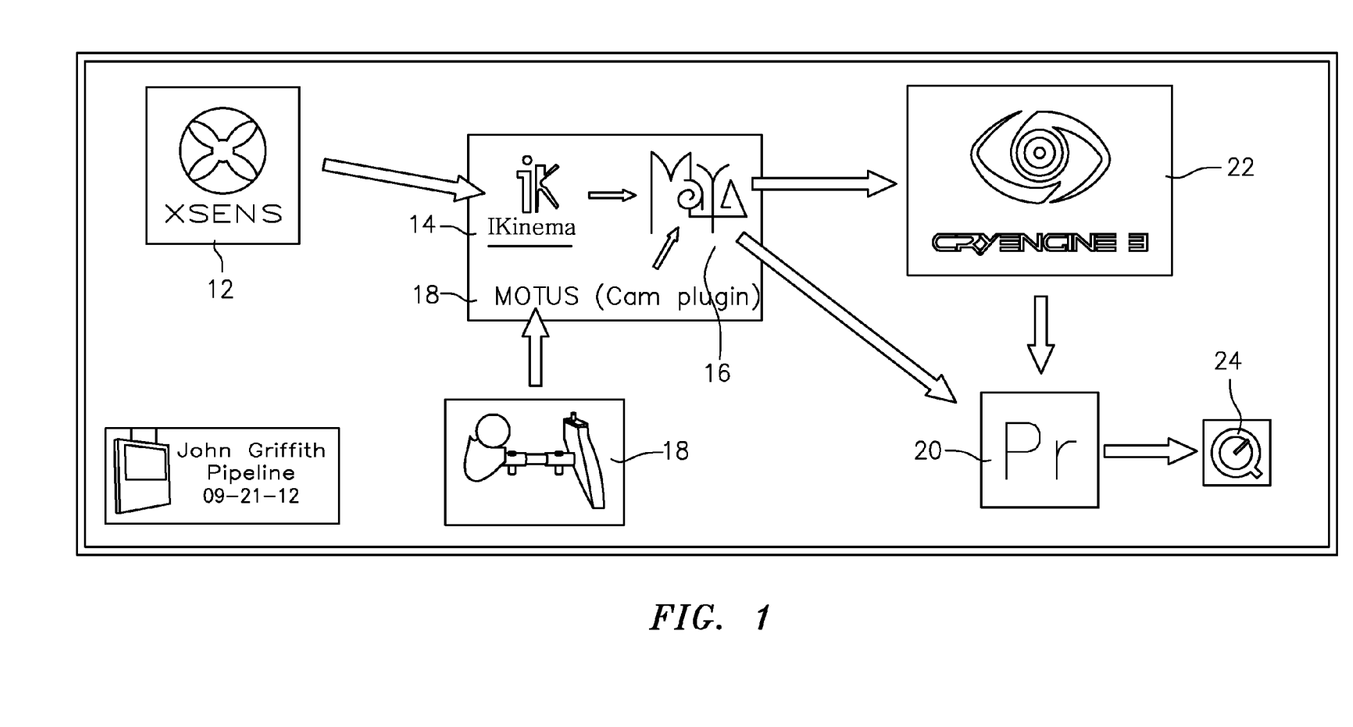
FIG. 1 illustrates an exemplary flowchart for rapid film pre-visualization.

Turning to FIG. 1, a flowchart of an exemplary system includes a motion capturing component 12, shown here as an XSENS system, including such a motion grid and MVN suits (which include accelerometers therein). The present inventors have also modified the suits with attachment points for harnesses via reinforced holes and reinforced accelerometers.

An exemplary system for interfacing with the virtual digital rendering component 16 (e.g., MAYA) includes an IKinema system 14, which generates 'stick figures' from the positional data emitted by accelerometers in the suit(s). In exemplary embodiments, the virtual digital rendering component 16 (e.g., MAYA), provides the environment framework for generating characters in a virtual three dimensional space. While the following portions of the specification specifically refer to various specific systems, such as XSENS, IKinema, MAYA, CRYENGINE 3, Adobe, etc., it should be recognized that they are merely exemplary systems, and other systems may be used within the basic framework of the invention.

Referring still to FIG. 1, in exemplary embodiments, a controller 18 acts as a virtual camera within the framework provided by MAYA 16 via a virtual camera plugin 18. Generated pre-visualization may then be output simply, e.g., as flat shaded blasts, for approval, or with additional detail, such as a virtual world provided by an engine 22 such as CRYENGINE 3. This additional detail may be provided with the MAYA or MAYA/CINEBOX data for display to the director so that the director receives an immersive image (even to the level of detail representative of actual film production) for use of the virtual camera controller to direct action. Once a pre-visualization is considered satisfactory (at 20), it may further be exported as a known or common format for storage (at 24).

Figure 2:
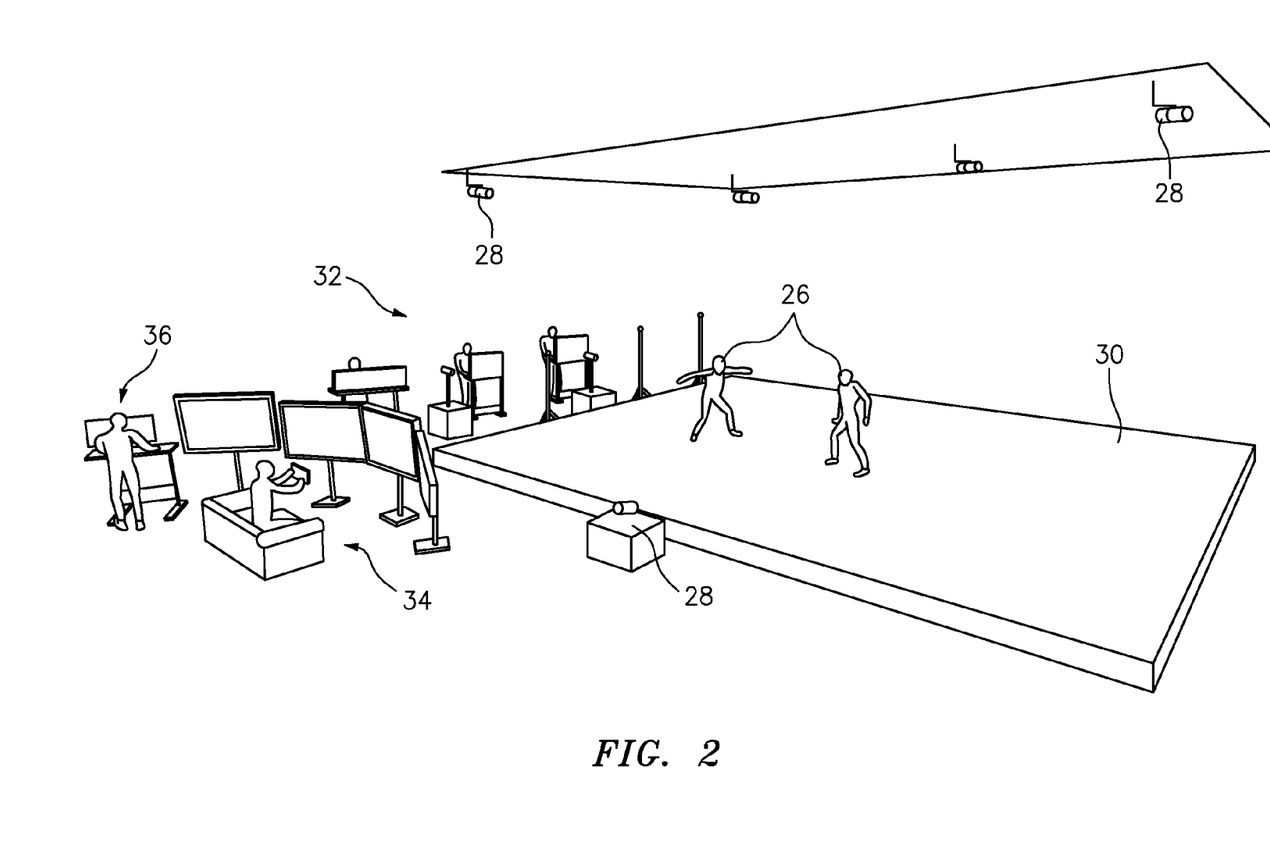
FIG. 2 illustrates a perspective view of an exemplary pre-visualization setup in accordance with the present disclosure.

Referring now to FIG. 2, an exemplary diagram of a set including exemplary aspects of the present invention is shown in perspective. An XSENS motion capture system is illustrated, including performers in motion sensing suits 26. The XSENS system includes RF detectors 28, which detect motion of the suits on a stage 30. Various terminals, shown generally at 32, are also illustrated for motion capture and three dimensional virtual environment rendering. An exemplary director's area 34 and exemplary directed image processing area 36 are also generally illustrated, but will be described in more detail below.

Figure 3:
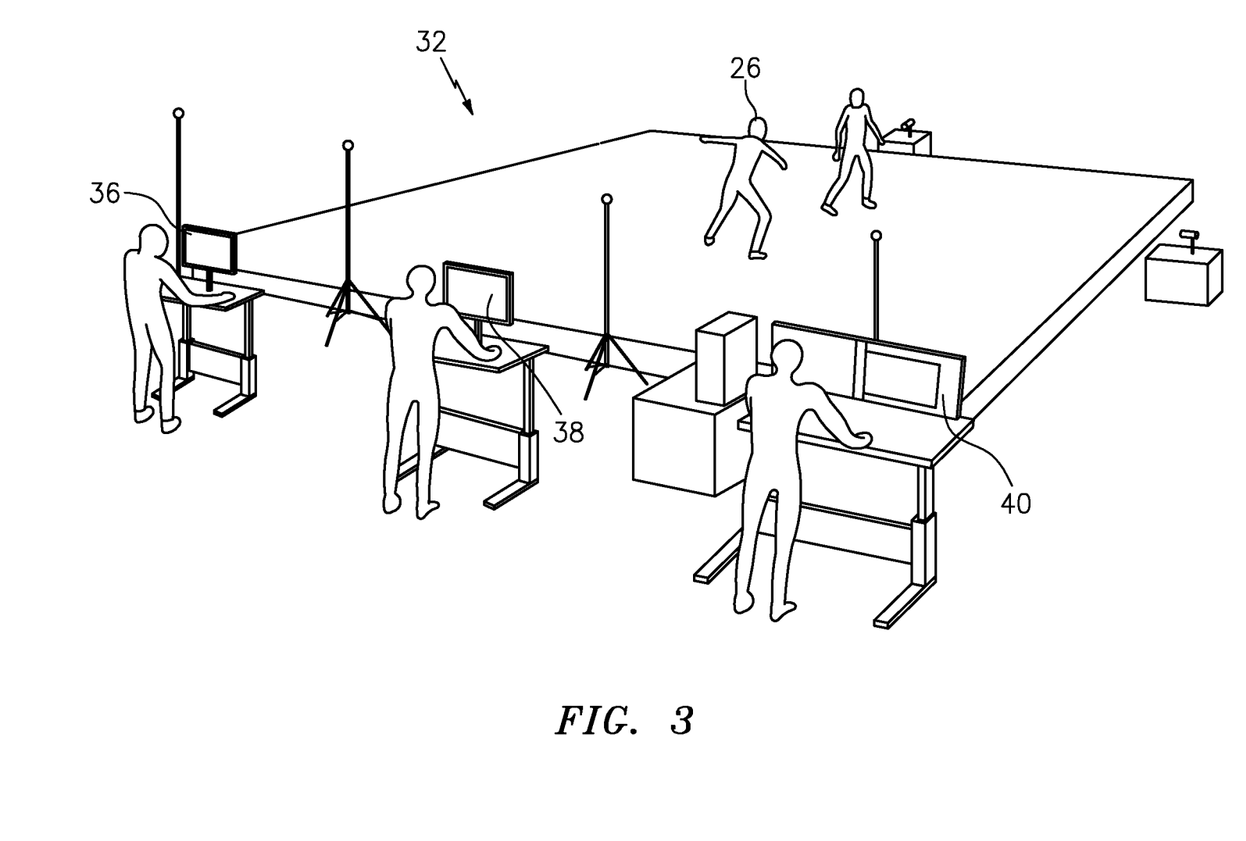
FIG. 3 illustrates a perspective view of an exemplary setup for data capture and processing of data into a three dimensional virtual environment.

Referring now to FIG. 3, an exemplary motion capture and virtual environment rendering terminals are generally shown at 32. A first exemplary terminal 36 (labeled as a MVN Studio) captures data from the suits 26. A second exemplary terminal 38 (labeled as MAYA TD) renders the captured data into a three dimensional virtual environment. A third exemplary terminal 40 (labeled as MAYA/CINEBOX AD) provides an optional image enhancement, such as rendering the captured motion for a given suit a specific character for viewing by the director or other user.

Figure 4:
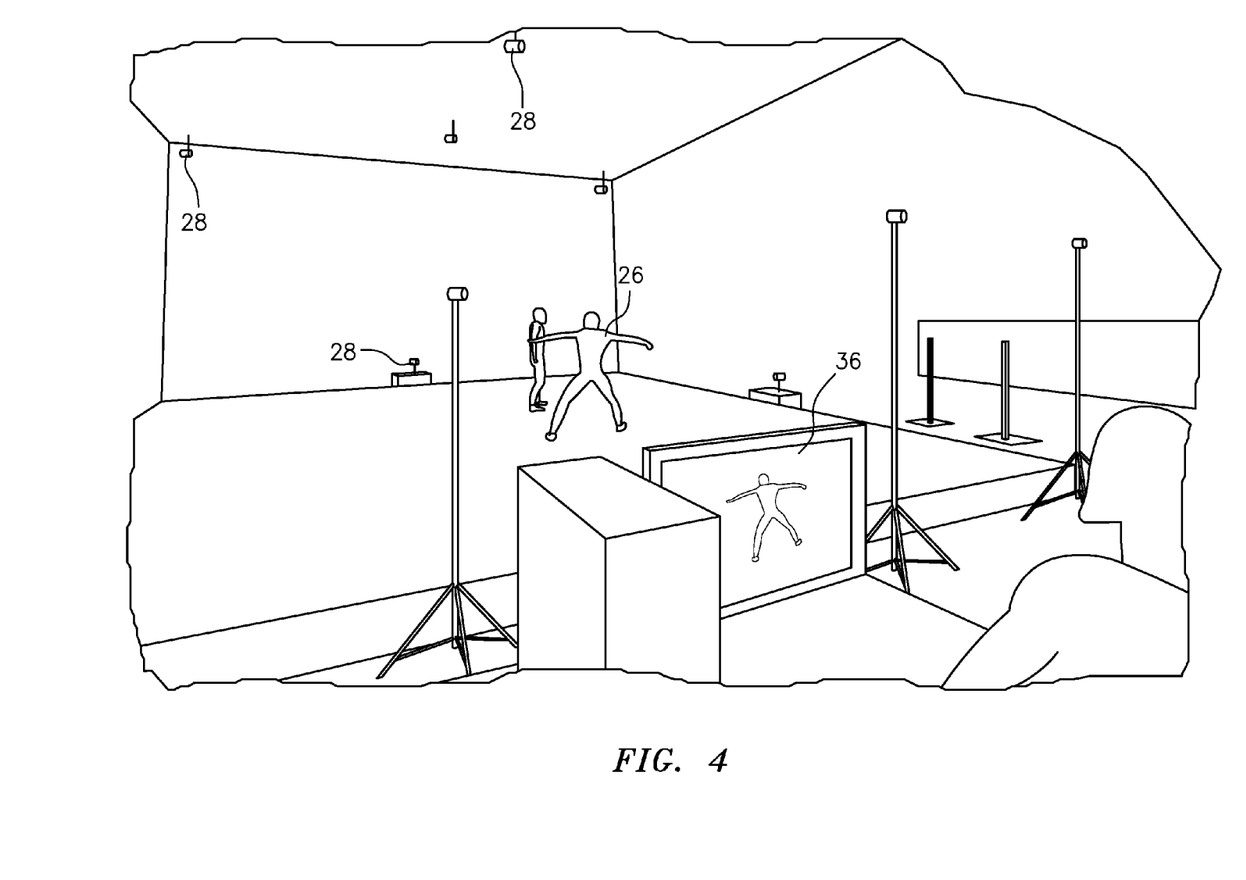
FIG. 4 illustrates a perspective view of an exemplary setup for data capture.

FIG. 4 further shows exemplary capture of data within the MVN motion grid (including the RF detectors 28) of position and motion of the MVN suits 26 at the MVN Studio terminal 36.

Figure 5:
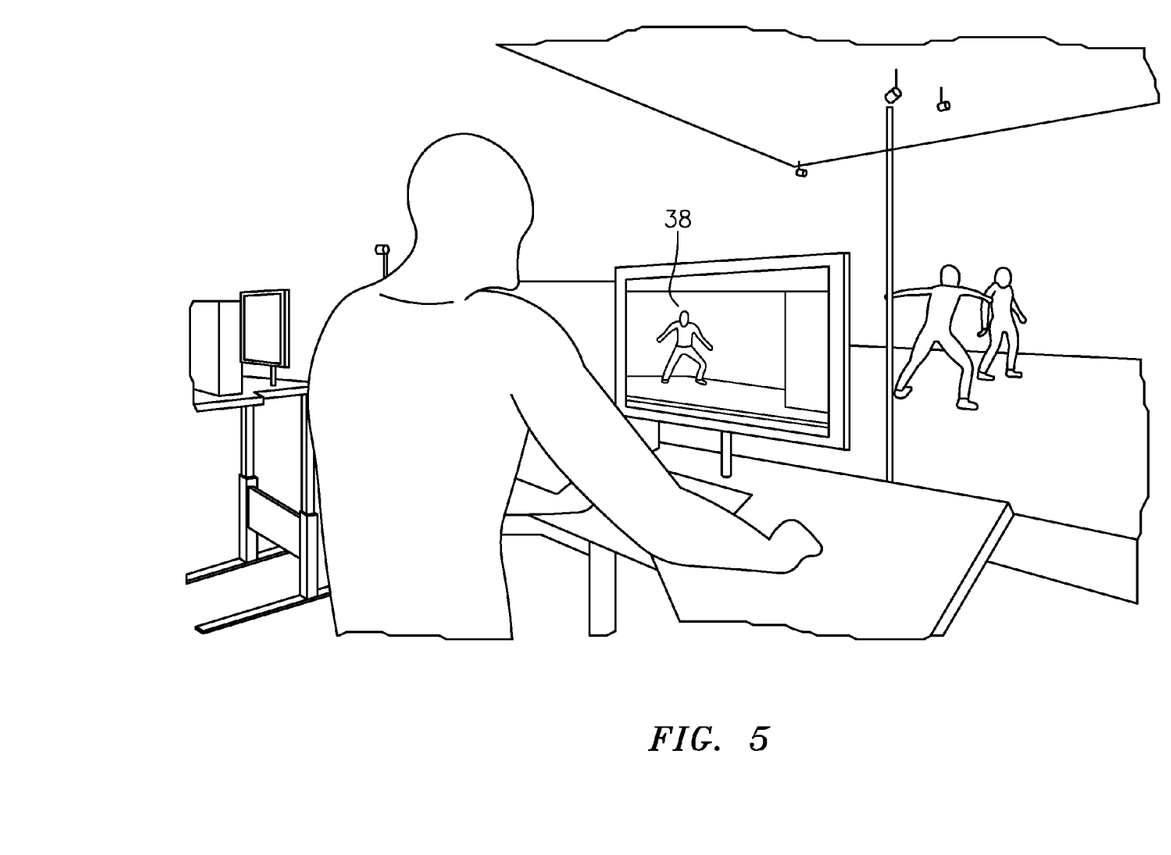
FIG. 5 illustrates a perspective view of an exemplary setup for processing of data into a three dimensional virtual environment.

FIG. 5 further shows exemplary conversion of the "stick figure" information into character information at the MAYA TD terminal 38.

Figure 6:
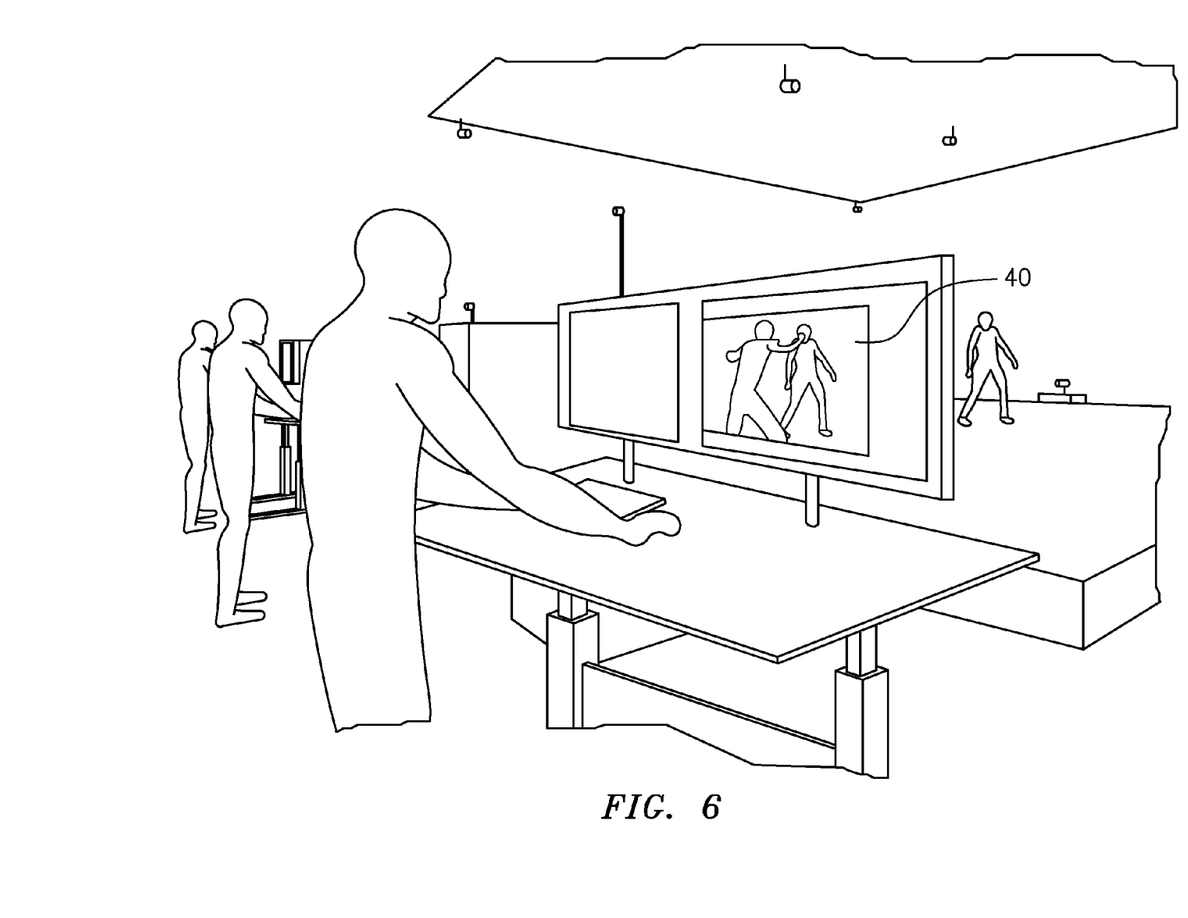
FIG. 6 illustrates a perspective view of an exemplary setup for processing of data into a three dimensional virtual environment.

FIG. 6 shows exemplary and optional additional shading or stereoscopic processing of the MAYA image at the MAYA/CINEBOX AD terminal 40.

Figure 7:
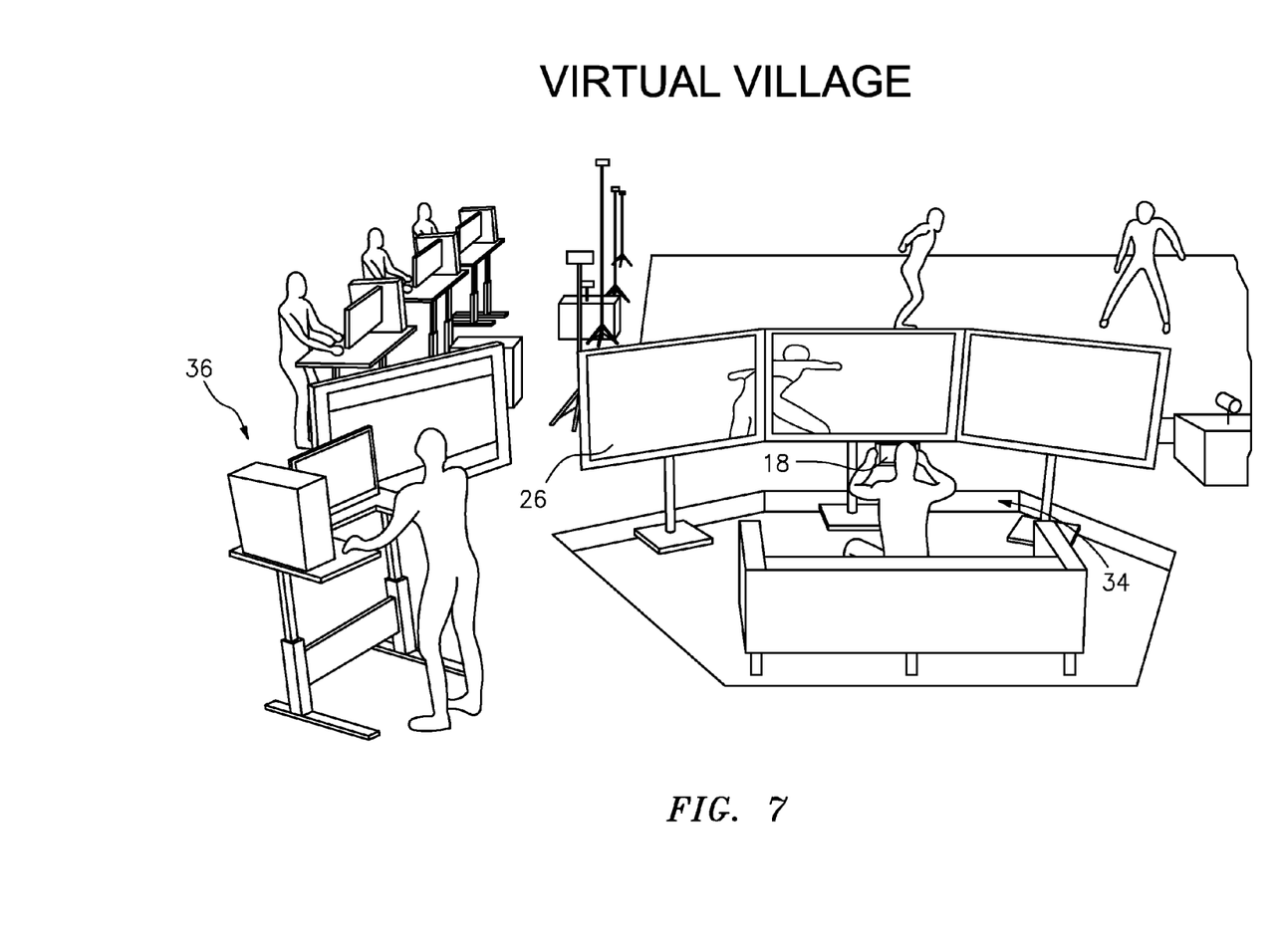
FIG. 7 illustrates a perspective view of an exemplary setup for a director's environment and an environment for processing directed material.

FIG. 7 shows an exemplary director's area 34 and an exemplary directed image processing area 36 together as a "virtual village." The exemplary director's area 34 includes a controller 18 that acts as a director's virtual camera in the virtual environment and a multi-panel set view 42 to immerse the director in the virtual environment while directing the camera action. The exemplary directed image processing area 36 (labeled in FIG. 7 as Adobe Premiere) includes software to edit the director's virtual shots.

Figure 8:
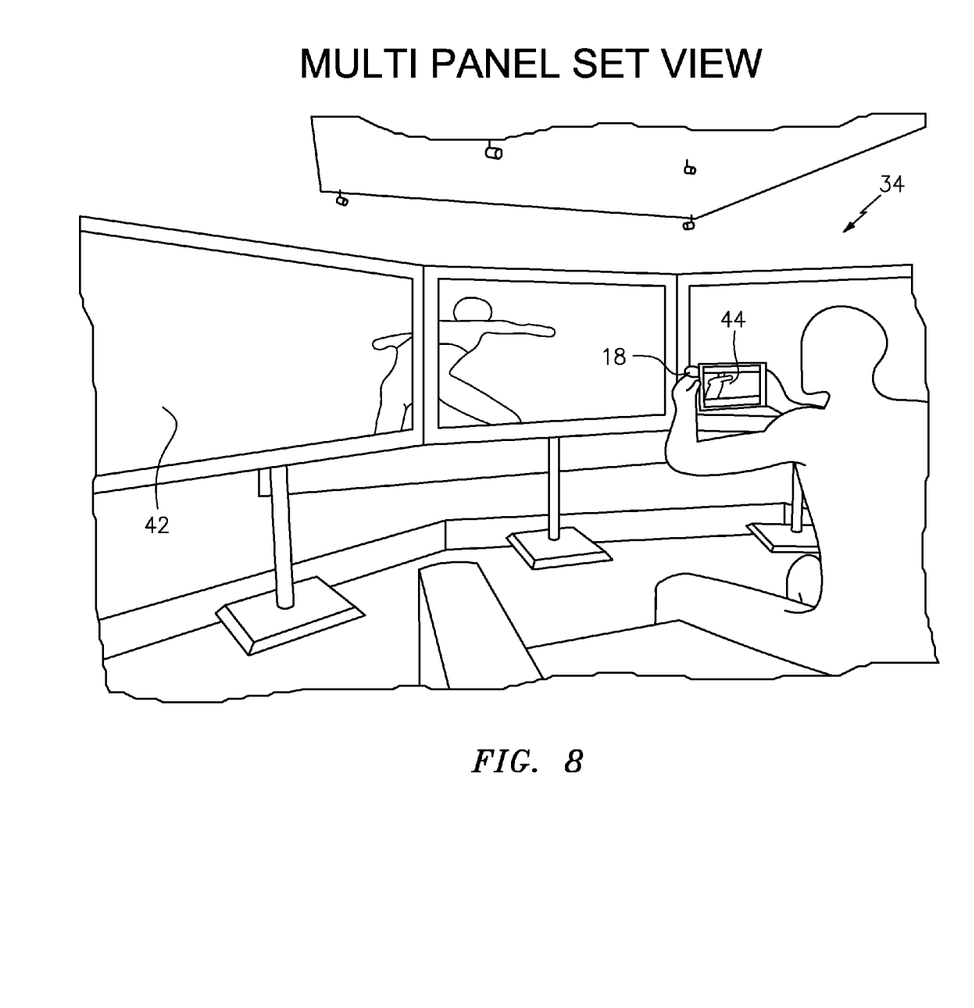
FIG. 8 illustrates a perspective view of an exemplary setup for a director's environment.

FIG. 8 illustrates the director's area 34 in more detail, including the exemplary multi-panel set view 42 and an exemplary handheld controller 18 with an integrated screen 44 imitating a camera's viewfinder.

Figure 9:
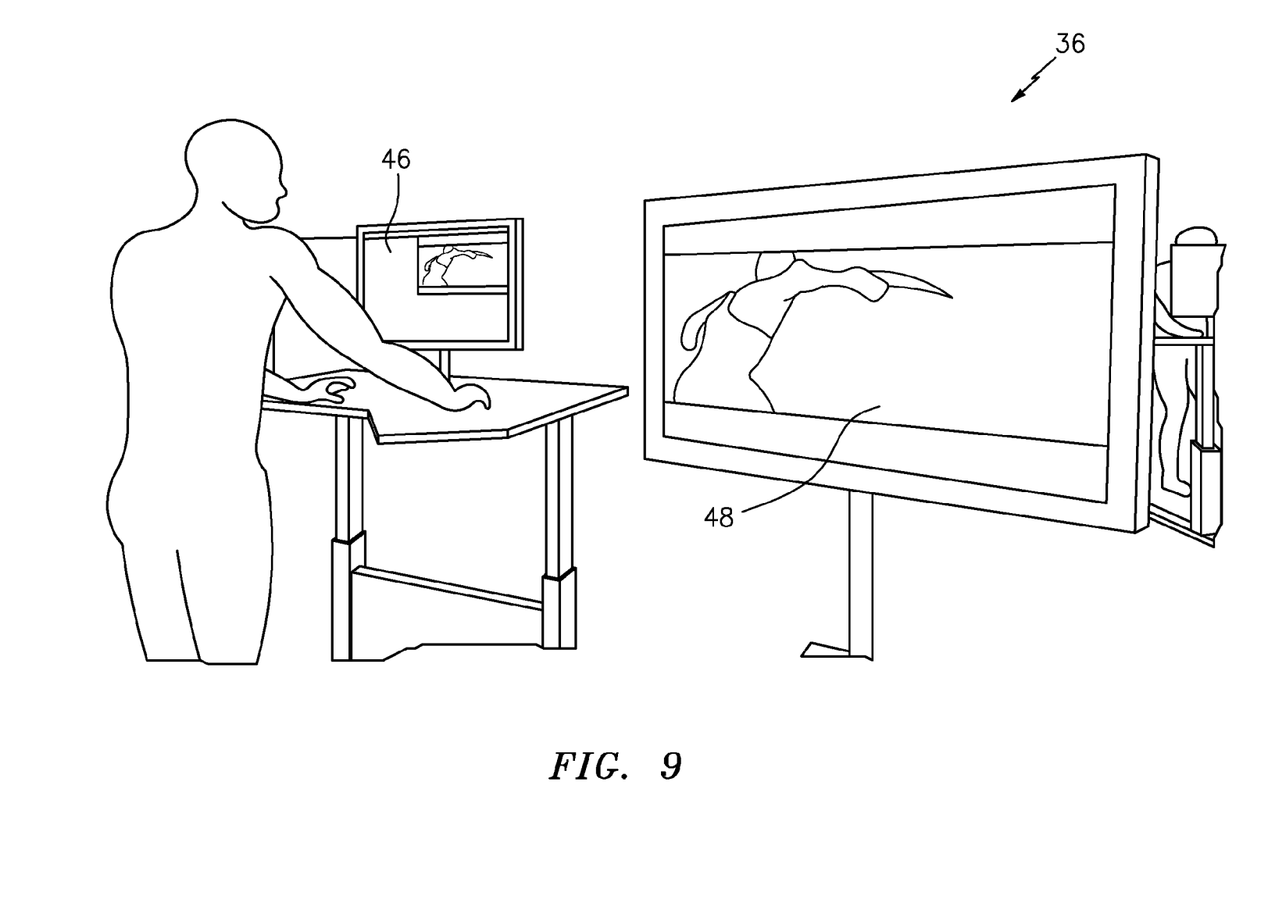
FIG. 9 illustrates a perspective view of an exemplary setup for an environment for processing directed material.

FIG. 9 similarly illustrates the directed image processing area 36 in more detail, showing an editing interface 46 and a display 48 showing the finished editing product.

Figure 10:
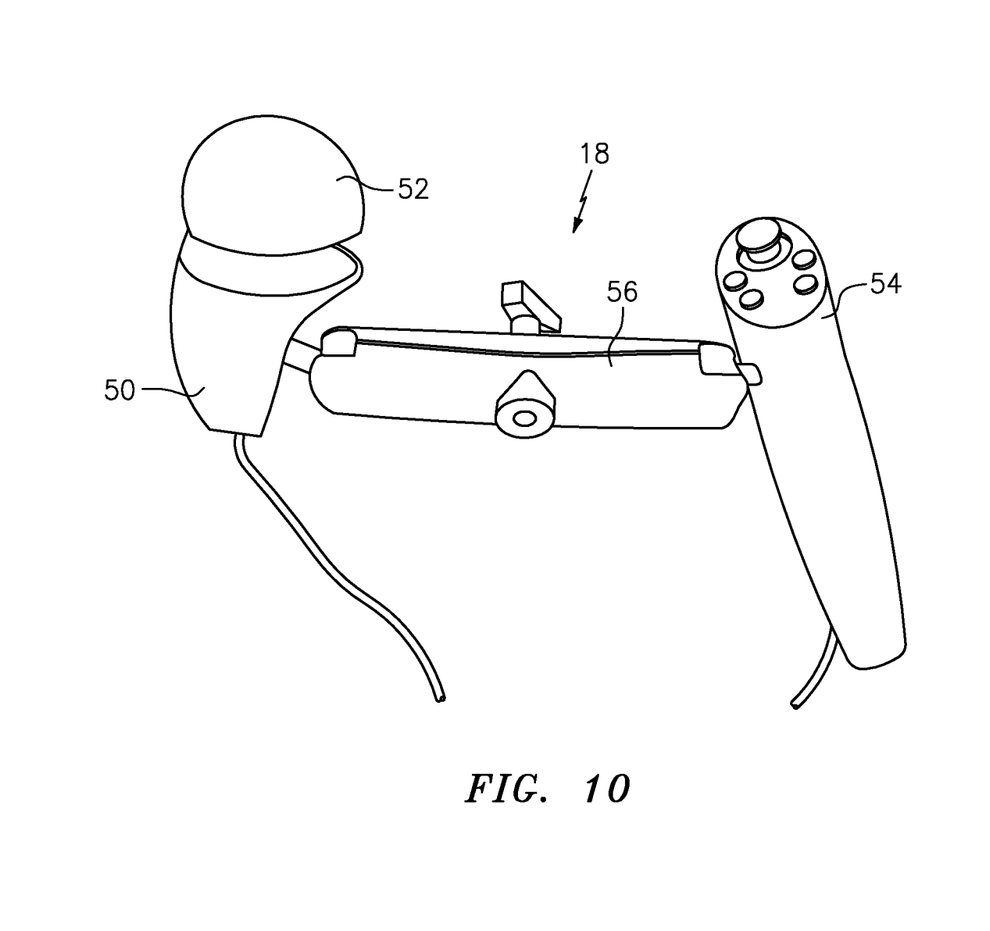
FIG. 10 illustrates an exemplary controller.
Figure 12:
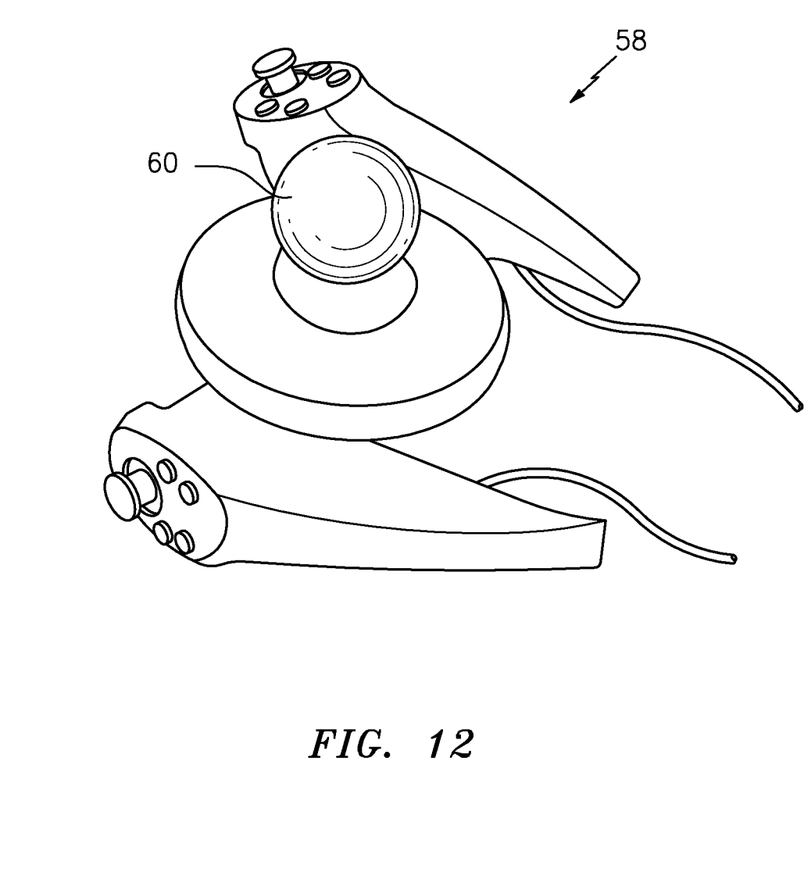
FIG. 12 illustrates a standard Razer Hydra controller.

FIG. 10 illustrates an exemplary controller 18 that acts as a virtual camera for a director. The exemplary controller includes a first handheld portion 50, which is configured with a navigation toggle 52 having six degrees of motion. The illustrated exemplary first handheld portion 50 is a modified controller with a toggle portion from a "Space-Navigator" product made by 3dConnexion. A second handheld controller 54 is tethered to the first handheld controller 50 by an adjustable bar 56. The illustrated exemplary second handheld controller 54 is derived from a Razer Hydra control system (which is shown generally at 58 in FIG. 12). In exemplary embodiments, the illustrated system would also make use of the magnetic Orb Controller (60 in FIG. 12) from the Hydra kit.

Figure 11:
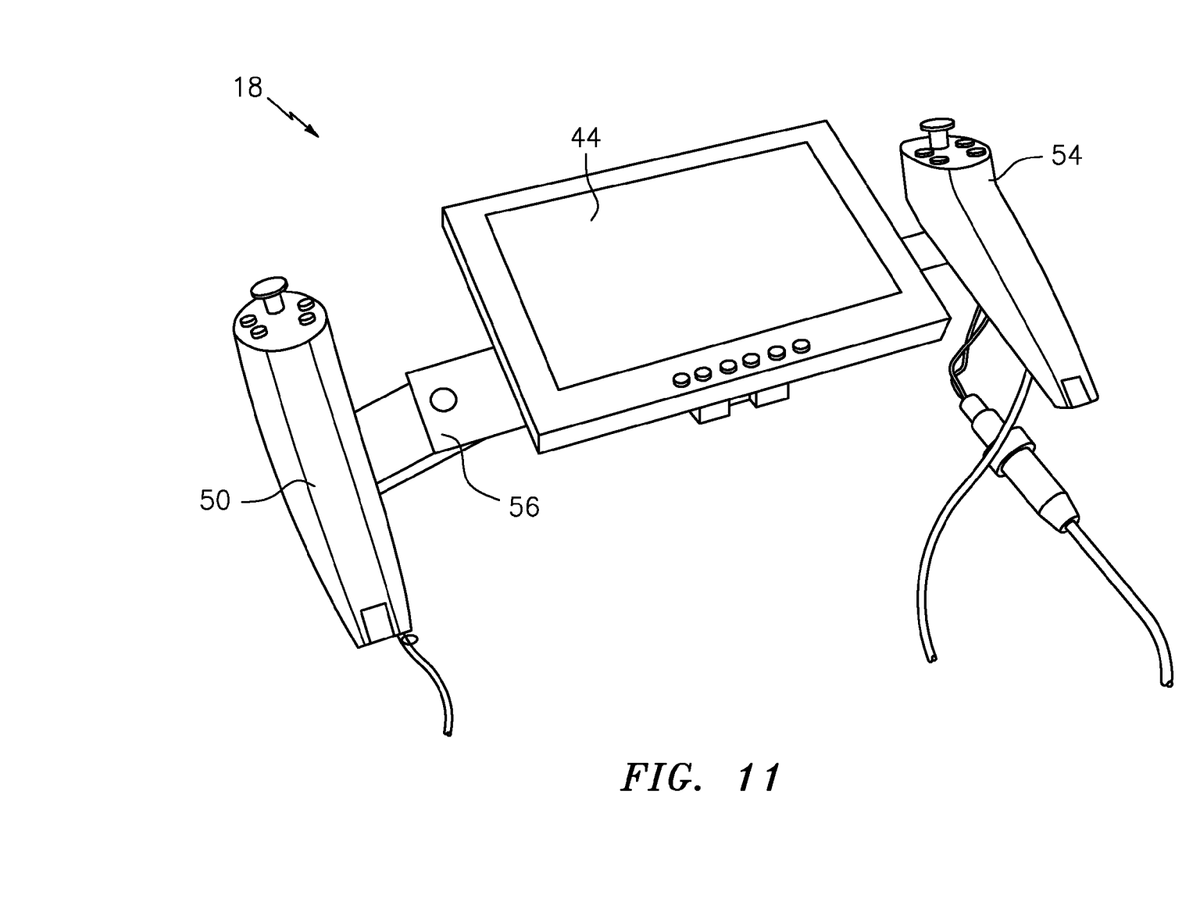
FIG. 11 illustrates another exemplary controller including a virtual camera viewfinder screen.

FIG. 11 shows another exemplary controller 18. This exemplary controller includes first 50 and second 54 handheld controllers (with the first optionally configured as a Razer Hydra controller), a connection bar 56, and a video screen 44 (also shown in FIG. 8) that is configured to act as a virtual viewfinder for a director or user.

It should be emphasized that the above-described example embodiments of the present invention, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. For example, the present invention should not be construed as being limited to a pre-visualization setting, since it should be recognized that the ability to direct via the controller captured action in a three dimensional virtual environment may be equally applicable to capture of finished film shots as to capture of shots for pre-visualization of films. All such modifications and variations are intended to be included herein within the scope of this disclosure and the present invention and protected by the following claims.

What is claimed is:

1. A system for rapid film pre-visualization, comprising:
a motion capture component interfacing with wearable motion capture sensors;
a virtual digital rendering component configured to receive the captured motion and re-create such motion in a three dimensional virtual environment;
a display component configured to display an output of the virtual digital rendering component; and
a controller component, configured to interface with the virtual digital rendering component and to act as a virtual camera in a three dimensional virtual environment, the controller configured with plural handheld remote components configured to navigate within the three dimensional virtual environment and to control the virtual camera using film camera controls to control the visual aspects of shots within the three dimensional virtual environment.

2. A system in accordance with claim 1, wherein said motion capture component is an RF motion capture component that detects accelerometers in a wearable suit within an RF grid.

3. A system in accordance with claim 1, wherein said virtual digital rendering component comprises a MAYA platform.

4. A system in accordance with claim 1, wherein at least one handheld remote component includes a toggle allowing for at least six degrees of motional control.

5. A system in accordance with claim 1, wherein at least one handheld remote component includes a handheld remote that is sensitive to a reference magnetic field to provide real time positional information about the remote control relative to the reference magnetic field.

6. A system in accordance with claim 1, wherein two handheld remote components are coupled together.

7. A system in accordance with claim 6, further comprising a view screen attached to said handheld remote components, the view screen configured to act as a virtual viewfinder for the virtual camera.

8. A system in accordance with claim 1, wherein said controller component is configured to navigate as a virtual camera in said three dimensional virtual environment in real time to provide pre-visualization for a film.

9. A system in accordance with claim 8, wherein said display component comprises a multi-panel display configured to provide a user with immersive image data such that a user can navigate said virtual camera therein.

10. A system in accordance with claim 1, further comprising a virtual world component configured to provide the three dimensional virtual environment with realistic world detail.

11. A system in accordance with claim 1, wherein said navigation control includes a control component having six degrees of movement and wherein said film camera controls include pan, tilt and zoom controls.

12. A system in accordance with claim 1, wherein said virtual digital rendering component is configured to provide varying levels of detail in said three dimensional virtual environment for pre-visualization approval.

13. A system in accordance with claim 1, wherein said virtual digital rendering component is configured to provide rendering of flat-shaded blasts in said three dimensional virtual environment for pre-visualization approval.

14. A system in accordance with claim 1, wherein said virtual digital rendering component is configured to provide additional shading and stereoscopic processing to rendered figures derived from said received data in said three dimensional virtual environment for pre-visualization approval.

15. A system in accordance with claim 1, wherein said virtual digital rendering component is configured to provide additional detail development in said three dimensional virtual environment for pre-visualization approval.

16. A system in accordance with claim 1, wherein said virtual digital rendering component is configured to provide virtual terrain in said three dimensional virtual environment for pre-visualization approval.

17. A system in accordance with claim 1, wherein said virtual digital rendering component is configured to provide a level of detail that is representative of actual film production in said three dimensional virtual environment for pre-visualization approval.

18. A system in accordance with claim 1, wherein said display component comprises plural displays surrounding a director configured to immerse a director in the virtual environment while the director directs the camera action utilizing the controller component.

19. A system in accordance with claim 18, wherein captured and rendered data follows a data pipeline from data capture to data rendering to a director's station, with further manipulation of data responsive to the controller component utilized by the director.

20. A system in accordance with claim 1, wherein said motion capture component interfaces with wearable motion capture sensors on suits with attachment points for harnesses via reinforced holes and reinforced accelerometers.

21. A method for rapid film pre-visualization, comprising:
capturing position and motion data of wearable position and motion capture sensors using a motion capture system including plural sensor detectors;
digitally rendering said captured data and re-creating motion of the sensors in a three dimensional virtual environment;
displaying an output of the motion in the three dimensional virtual environment; and
providing a controller component that is configured to interface with a three dimensional virtual environment to act as a virtual camera in the three dimensional virtual environment, the controller configured with plural handheld remote components configured to navigate within the three dimensional virtual environment to control the virtual camera using film camera controls within the three dimensional virtual space.

22. A method in accordance with claim 21, wherein said navigation control includes a control component having six degrees of movement and wherein said film camera controls include pan, tilt and zoom controls.

23. A system in accordance with claim 22, wherein captured and rendered data follows a data pipeline from data capture to data rendering to a director's station, the director's station at least including said display component and said controller component, the director's station providing a modification point of the data pipeline input to the director's station, the data pipeline input comprising data from data capture through virtual digital rendering.

24. A system in accordance with claim 23, wherein said director's station is configured to provide an export of director pre-visualization to a storage component.

* * * * *